United States Patent [19]
Mori

[11] 4,002,373
[45] Jan. 11, 1977

[54] BRAKE OPERATING SYSTEM FOR USE IN ELECTRICALLY DRIVEN VEHICLES

[75] Inventor: Katsuyoshi Mori, Tokyo, Japan

[73] Assignee: Kabushiki Kaisha Komatsu Seisakusho, Tokyo, Japan

[22] Filed: Apr. 8, 1975

[21] Appl. No.: 566,612

[52] U.S. Cl. .................................. 303/3; 303/6 A; 303/52

[51] Int. Cl.² ........................................ B60T 13/74

[58] Field of Search .................. 303/15, 13, 3, 6 R, 303/6 C, 2, 8, 50, 52, 20, 6 A; 188/152; 338/108, 153

[56] References Cited

UNITED STATES PATENTS

| | | | |
|---|---|---|---|
| 3,507,541 | 4/1970 | Ayers, Jr. | 303/13 X |
| 3,545,815 | 12/1970 | Berg | 303/13 X |
| 3,650,568 | 3/1972 | Poplawski | 303/2 |
| 3,712,685 | 1/1973 | Hoffmann | 303/13 X |
| 3,730,596 | 5/1973 | Felix et al. | 303/13 X |

Primary Examiner—Trygve M. Blix
Assistant Examiner—Douglas C. Butler
Attorney, Agent, or Firm—Armstrong, Nikaido & Wegner

[57] ABSTRACT

Brake operating system for use in electrically driven vehicles having an electric brake and a pneumatic brake. Both the electric and pneumatic brakes are respectively operated by their respective operating apparatus different from and independent of each other when a brake pedal is depressed. The operating apparatus of the electric brake comprises a rheostat and a mechanism for mechanically operating the rheostat by depression of the brake pedal, while that of the pneumatic brake comprises a compressed air, pneumatic circuit divided into two lines independent of each other so as to respectively introduce the compressed air into two pairs of power clusters which are respectively connected to respective brakes for front and rear wheels, and a pair of brake valves respectively provided in the pneumatic circuit lines and simultaneously operated by depression of the brake pedal.

2 Claims, 5 Drawing Figures

4,002,373

BRAKE OPERATING SYSTEM FOR USE IN ELECTRICALLY DRIVEN VEHICLES

BACKGROUND OF THE INVENTION

1. Field of the Invention:

This invention relates to a brake operating system, and more particularly to a novel and improved brake operating system for use in electrically driven vehicles.

2. Description of the Prior Art:

In general, electrically driven vehicles, especially large-sized electrically driven construction vehicles, of which driving wheels thereof are rotatably driven by an electric motor include a pneumatically operated brake, which is hereinafter called as a pneumatic brake, and an electric brake in which a braking energy is converted into an electric energy by utilizing the electric motor as a generator when the braking operation is acted on the vehicles.

In many of conventional brake operating systems for use in such electrically driven vehicles, both the pneumatic brake and the electric brake are operated through their respective brake valves by the action of compressed air when a brake pedal is depressed. The compressed air is supplied through a pneumatic circuit from an air compressor into main and sub air storage tanks connected to each other by the interposition of a check valve and further supplied therefrom through the respective brake valves into a pneumatic circuit for the pneumatic brake and that for the electric brake, respectively, so as to operate those brakes. Therefore, if any trouble should happen in the pneumatic circuit provided between the compressor and the main tank, the supply of compressed air not only to the main tank but also to the sub tank will be stopped. As a result, it becomes impossible to apply not only the pneumatic brake but also the electric brake to a vehicle. In addition, in the conventional system, it has not been possible to make brakes for front and rear wheels of the vehicle independent of each other because the pair of brake valves of a dual treadle type are provided for the pneumatic and electric brakes so as to divide the respective circuit into two lines independent of each other.

The brake valves should be preferably provided in the pneumatic circuit for the pneumatic brake so as to divide the circuit into two lines which are independent of each other and respectively connected to the respective brakes for the front and rear wheels, thus either of the respective brakes for the front and rear wheels may perform the braking function even if any trouble should happen in either of the two lines.

SUMMARY OF THE INVENTION

The present invention has been made in consideration of the above circumstances to eliminate the above described disadvantages of the conventional brake operating systems.

It is therefore a primary object of the present invention to provide a brake operating system for use in electrically driven vehicles having an electric brake and a pneumatic brake therein in which the operation of the electric brake is performed without having a connection with a pneumatic operation of the pneumatic brake and a pneumatic circuit for the pneumatic brake is divided into two lines, which are independent of each other and respectively applicable to respective brakes for front and rear wheels of the vehicles, so that at least one of the brakes may perform the braking function even when any trouble should happen in the pneumatic circuit, thereby increasing the safety of the vehicles.

According to a first aspect of the present invention, there is provided a brake operating system for use in electrically driven vehicles having therein a pneumatic brake and an electric brake wherein the electric and pneumatic brakes are operated by their respective operating means different from and independent of each other when a brake pedal is depressed.

According to a second aspect of the present invention, there is provided the brake operating system as set forth in the first aspect wherein the operating means of the electric brake comprises a rheostat and a mechanism for mechanically operating the rheostat through only machine elements by depression of the brake pedal.

According to a third aspect of the present invention, there is provided the brake operating system as set forth in the first aspect wherein the operating means of the pneumatic brake comprises compressed air supplied from an air compressor, pneumatic circuit means divided into two lines independent of each other so as to respectively introduce the compressed air into two pairs of power clusters which are hydraulically connected to respective brakes for front and rear wheels, respectively, and a pair of brake valves respectively provided in the pneumatic circuit lines and simultaneously operated by depression of the brake pedal.

According to a fourth aspect of the present invention, there is provided the brake operating system as set forth in the second aspect wherein the rheostat operating mechanism comprises a casing, a link mechanism connected through one end thereof to the brake pedal and connected through the other end thereof to the casing, a rack slidingly supported by the casing and always urged in one longitudinal direction thereof by a spring, the rack being moved through one end thereof coming into contact with the link mechanism by depression of the brake pedal in the longitudinal direction thereof opposite to that urged by the spring, and a pinion fixedly mounted on an input shaft of the rheostat and engaged with the rack.

BRIEF DESCRIPTION OF THE DRAWINGS

The above and other objects, features and advantages of the present invention will become apparent from the following description taken in conjunction with the accompanying drawings in which.

DETAILED DESCRIPTION OF THE PREFERRED EMBODIMENT

For better understanding of the present invention, a conventional brake operating system for use in electrically driven vehicles will be hereinafter described with reference to FIG. 1.

Figure 1:
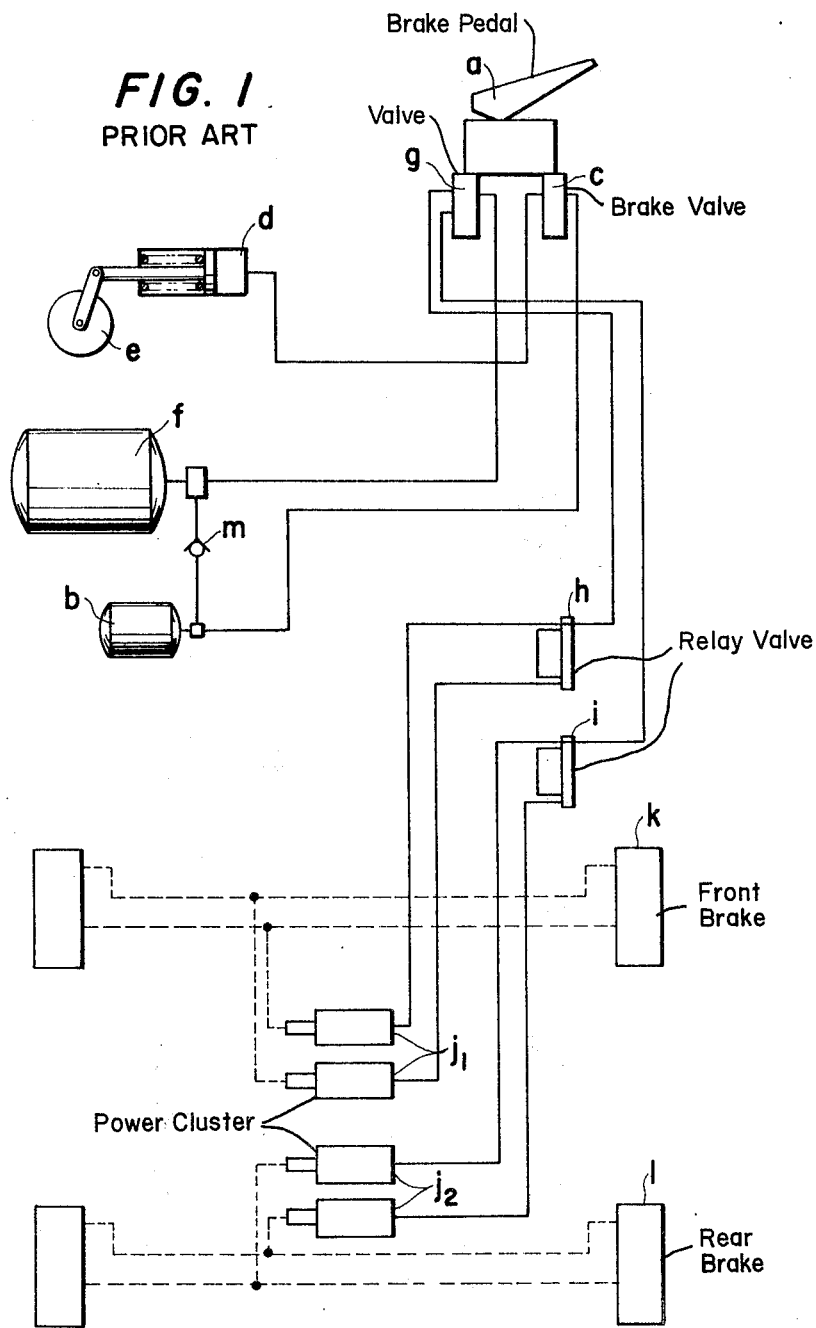
FIG. 1 is a view of explanatory circuit diagram of a conventional brake operating system for use in a electrically driven vehicle.

The conventional brake operating system has a pneumatic circuit diagram as shown in FIG. 1. Namely, by depression of a brake pedal $a$ opens a brake valve $c$ through which compressed air in a sub air tank $b$ passes into a control cylinder $d$ for a rheostat $e$, the piston in the control cylinder is moved against the biassing force of a compression spring, which is provided in the cylinder, by the pressure of the compressed air to control the rheostat $e$, thereby controlling an electric brake.

By further depression of the brake pedal $a$ opens a valve $g$ through which compressed air in a main air tank $f$ is supplied to relay valves $h$ and $i$ and then to power clusters $j_1$ and $j_2$ respectively to create hydraulic pressure, thereby operating brakes $k$ and $l$ for front and rear wheels of the vehicle.

Thus, the pneumatic circuit of the above described conventional brake operating system is provided therein with the main air tank $f$ and the sub air tank $b$ connected through a check valve $m$ to each other and the electric brake and the pneumatic brake are respectively operated by two circuit lines divided independently of each other so that the safety is increased. Since compressed air, however, is supplied by an air compressor from the outside to the main air tank $f$, if any trouble should occur in the air supplying circuit provided between the air compressor (not shown) and the main tank $f$, the supply of compressed air not only to the main tank $f$ but also to the sub tank $b$ will be stopped. As a result, not only the electric brake but also the pneumatic brake to the vehicle will fail to operate.

Furthermore, in the conventional system, it is not able to attain to make brakes for the front and rear wheels independent of each other, because the pair of brake valves of dual treadle type are respectively provided in the respective pneumatic circuit lines for the electric and pneumatic brakes so as to divide the respective circuit lines into two lines independent of each other. Therefore, there is in the conventional system an inconvenience that, if any trouble should happen in either pneumatic circuit between the main air tank $f$ and the valve $g$ or between the valve $g$ and the respective relay valves $h$ and $i$, both the brakes for the front and rear wheels simultaneously lose the braking function.

Figure 2:
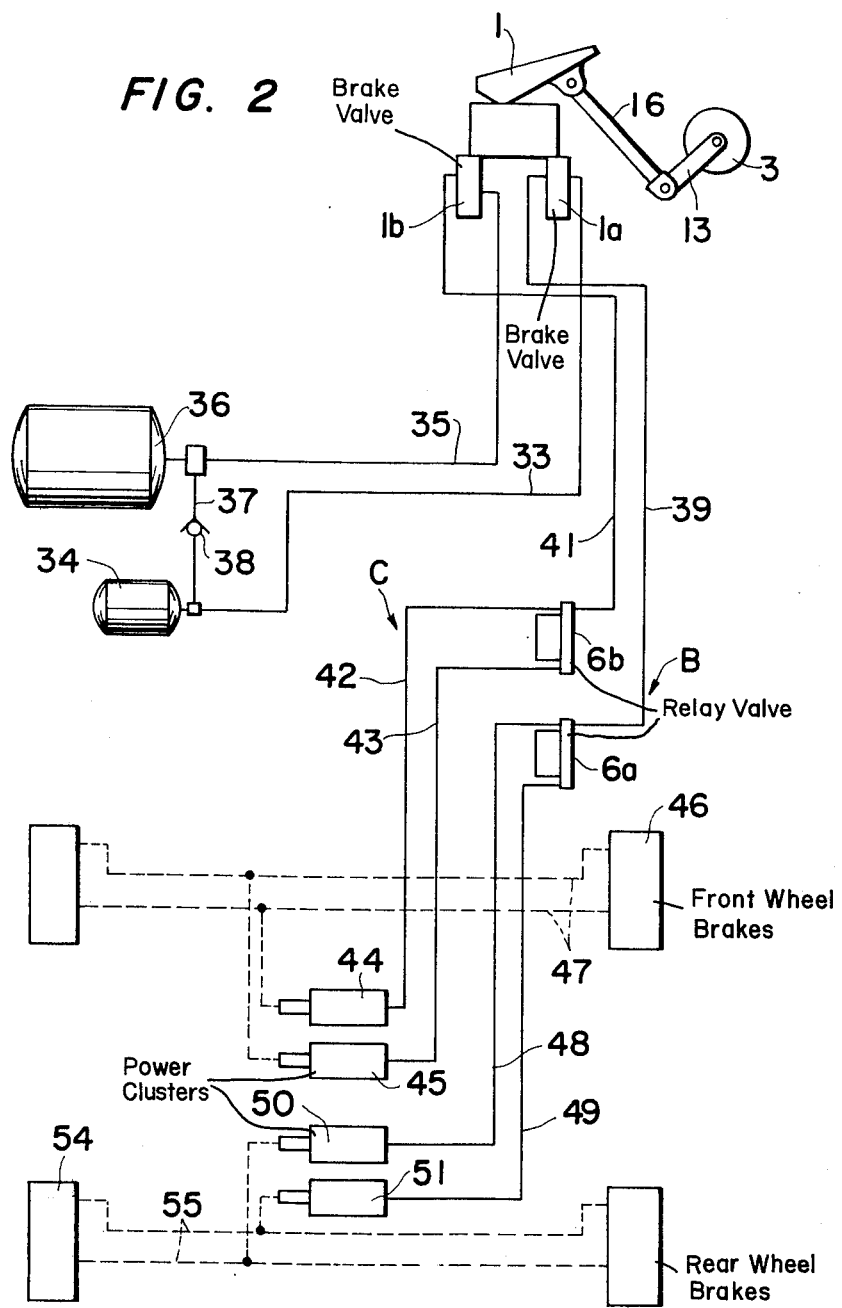
FIG. 2 is a view of explanatory circuit diagram of an embodiment of the present invention.
Figure 5:
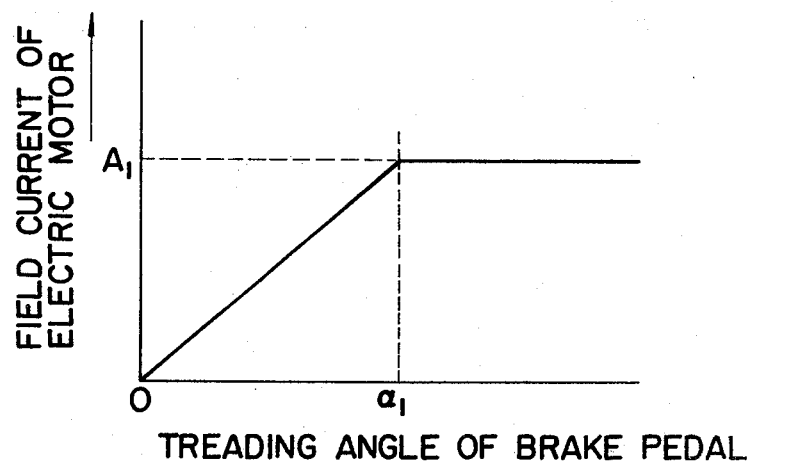
FIG. 5 is a graph showing the field current of an electric motor variable relative to the treading angle of the brake pedal.

Turning now to FIGS. 2 and 5, the present invention is hereinafter described in detail.

Reference is made to FIGS. 2 and 5 which shown one embodiment of the present invention, a pair of brake valves 1a and 1b of dual treadle type are operated by a predetermined treading force of a brake pedal 1. An inlet port of the brake valve 1a is connected through a line 33 to sub air tank 34, while an outlet port thereof is connected through a line 39 to an inlet port of a relay valve 6a. An inlet port of the brake valve 1b is connected through a line 35 to a main air tank 36, while an outlet port thereof is connected through a line 41 to an inlet port of a relay valve 6b. The main tank 36 and the sub tank 34 are connected to each other through a line 37 in which a check valve 38 is provided. Outlet ports of the relay valve 6a are connected through lines 48 and 49 to a pair of power clusters 50 and 51, respectively, and respective hydraulic pressure sides of the power clusters 50 and 51 are connected through hydraulic lines 55 to respective working parts of rear wheel brakes 54. On the other hand, outlet ports of the relay valve 6b are connected through lines 42 and 43 to another pair of power cluster 44 and 45, respectively, and respective hydraulic pressure sides of the power clusters 44 and 45 are connected through hydraulic lines 47 to respective working parts of front wheel brakes 46. (FIG. 2)

As is clear from the above description, a brake operating system B of the pneumatically operated rear wheel brakes 54 comprises a sub air tank 34, pneumatic line 33, brake valve 1a, pneumatic line 39, relay valve 6a, pneumatic lines 48 and 49, and power clusters 50 and 51. And, a brake operating system C of pneumatically operated front wheel brakes 46 comprises a main air tank 36, pneumatic line 35, brake valve 1b, pneumatic line 41, relay valve 6b, pneumatic lines 42 and 43, and power clusters 44 and 45.

Figure 3:
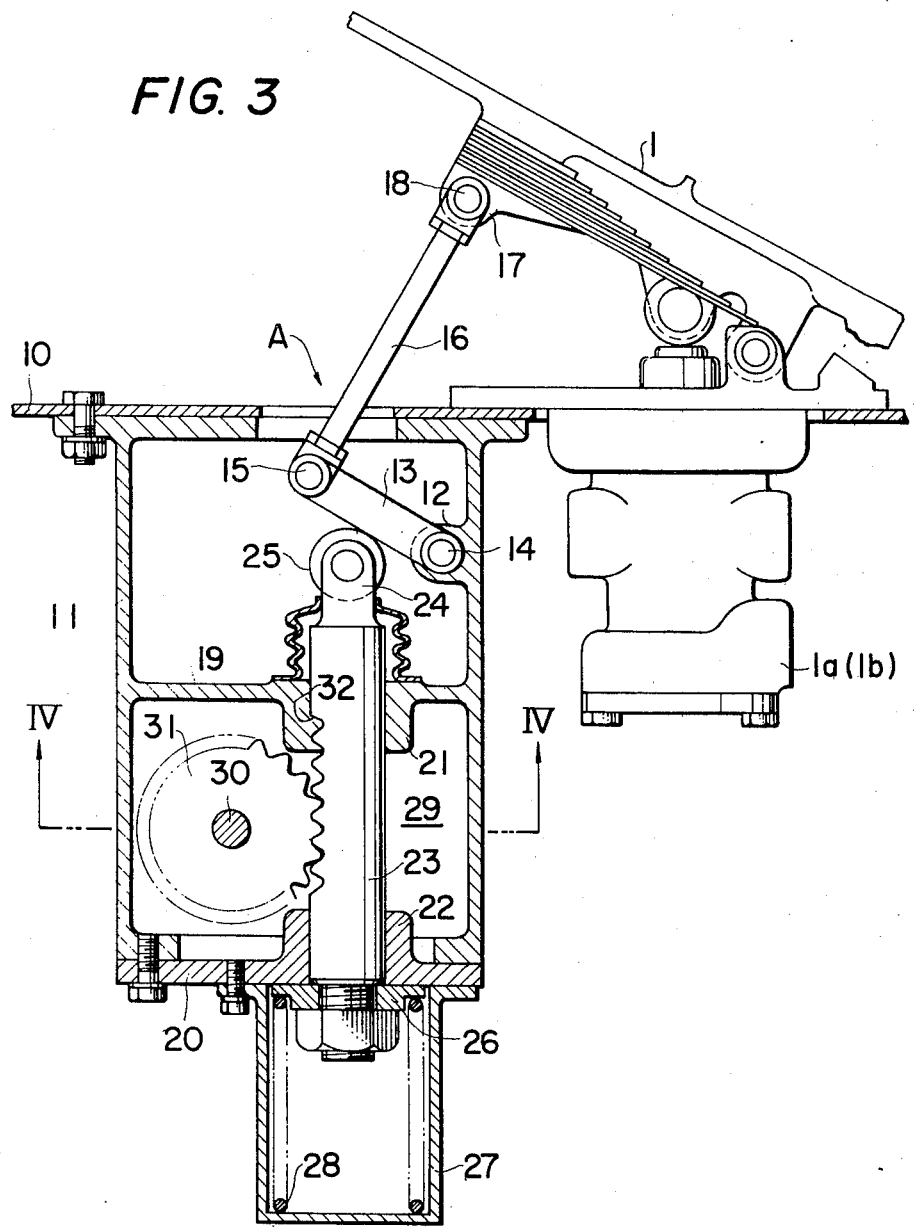
FIG. 3 is a vertical sectional view of a mechanism for mechanically operating a rheostat.
Figure 4:
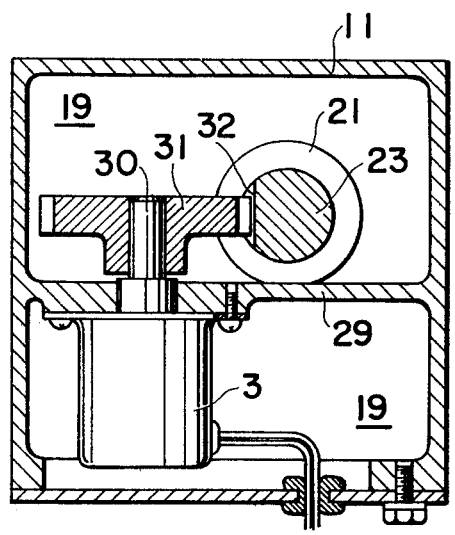
FIG. 4 is a sectional view taken along line IV—IV shown in FIG. 3.

In FIG. 3, reference character A represents a mechanism for mechanically operating a rheostat 3. The mechanism A comprises a casing 11 fixedly secured to a floor-board 10 of the vehicle. The inner wall of the casing 11 is formed with a support 12 to which the lower end of a link 13 is pivotally connected by a pivotal pin 14. The upper end of the link 13 is pivotally connected through a pivotal pin 15 to the lower end of a link 16. The upper end of the link 16 is pivotally connected through a pivotal pin 18 to a support 17 of the brake valve 1. The casing 11 is provided therein with supporting plates 19 and 20 which are formed with guide openings 21 and 22, respectively, through which a rack rod 23 is slidably inserted. The upper end of the rack rod 23 is provided a roller 25 through a bracket 24, while the lower end thereof is provided with a spring seat 26. At the lower side of the casing 11, a spring box 27 is fixedly secured to the supporting plate 20. Within the spring box 27 is disposed a compression spring 28 to always urge upwardly the rack rod 23 through the spring seat 26. Therefore, the roller 25 abuts against the link 13. (FIG. 3) Fixedly secured to a supporting plate 29 of the casing 11 is the rheostat 3 of which a pinion 31 engaging the rack 32 of the rack rod 23 is fixedly mounted on an input shaft 30 thereof. (FIG. 4) The rheostat 3 controls field current of an electric motor (not shown) of the vehicle so as to control the electric brake.

In the brake operating system thus constructed, when the brake pedal 1 is depressed, the rack rod 23 is moved downwards through the links 16 and 13, whereupon the rheostat 3 is operated through the cooperation of the rack rod 23 and the pinion 31, so that field current of the electric motor is controlled by the operation of the rheostat, thereby controlling the capacity of the electric brake.

When the brake pedal 1 is further depressed, the ports of the brake valves 1a and 1b simultaneously open to flow compressed air introduced from the sub air tank 34 and the main air tank 36 through the pneumatic lines 33 and 35 into the relay valves 6a and 6b through the pneumatic lines 39 and 41, respectively, and then into respective pairs of power clusters 50, 51 and 44, 45 for respectively actuating rear and front wheel brakes 54 and 46 by the action of hydraulic pressure created therein by the compressed air.

FIG. 5 is a graph showing the relationship between a degree of treading angle of the brake pedal 1 and a value of field current of the electric motor which is variable to a certain treading angle $\alpha_1$ in proportion to the variation of the treading angle. When the treading angle is $\alpha_1$ the field current is $A_1$, and thereafter even when the depression of the brake pedal is increased, the field current is maintained at $A_1$ without increasing over $A_1$.

As is clearly understood from the foregoing description, according to the brake operating system of the present invention, the electric brake and the pneumatic brake will not be simultaneously be stopped, nor will the pneumatically operated rear and front wheel brakes be simultaneously stopped even if any trouble should happen in one of their respective operating means because not only the rheostat operating mechanism A and both of the pneumatic brake operating systems B and C but also the the system B for the rear wheel brakes 54 and the system C for the front wheel brakes 46 are respectively operated by their respective operating means independent of each other. Therefore, a higher safety is accomplished for the vehicles in which the brake operating system of the present invention is provided.

What is claimed is:

1. In a brake operating system for use in an electrically driven vehicle said system including an electric brake system, pneumatically operated fron and rear wheel brake systems, a first fluid supply source coupled to said front wheel brake system and a second fluid supply source coupled to said rear wheel brake system, a pair of treadle type brake valves, each being pneumtically connected to one of said fluid supply sources, a brake pedal connected to said pair of brake valves and operating means for independently operating said electric and pneumatically operated brake systems, the improvement wherein said operating means comprises:
   a. pneumatic operating means for operating said pneumatically operated brake system, said pneumatic operating means having a pair of independent penumatic circuits, one of said circuits being connected between on of said brake valves and said front wheel brake system and the other circuit being connected between the other brake valve and said rear wheel brake system; and
   b. mechanical operating means including a linking means for operating said electric brake system said linking means being directly connected to said brake pedal independent of said pneumatic operating means and having a rheostat for controlling the field of an electric motor driving said vehicle and a mechanism for mechanically operating said rheostat said linking means being connected between said brake pedal and said rheostat, wherein upon depression of said brake pedal said electric brake and pneumatically operated brake systems are respectively operated through their respective operating means independently of each other.

2. The system as claimed in claim 1, wherein said rheostat operating mechanism comprises a casing, said linking means being pivotally connected through one end thereof to the brake pedal and pivotally supported through the other end thereof onto said casing, a rack rod slidably supported by said casing and always urged in one longitudinal direction thereof by a spring means so that one end thereof always comes into contact with said linking means, said rack rod being moved in the longitudinal direction thereof opposite to that urged by said spring means when the brake pedal is depressed, and a pinion fixedly mounted on an input shaft of said rheostat and engaged with said rack rod.

* * * * *